(12) United States Patent
Stamm

(10) Patent No.: US 7,395,982 B2
(45) Date of Patent: Jul. 8, 2008

(54) CARTRIDGE REEL CENTERING DEVICE

(75) Inventor: Stephen J. Stamm, Fort Lupton, CO (US)

(73) Assignee: Quantum Corporation, San Jose, CA (US)

( * ) Notice: Subject to any disclaimer, the term of this patent is extended or adjusted under 35 U.S.C. 154(b) by 401 days.

(21) Appl. No.: 11/090,106

(22) Filed: Mar. 24, 2005

(65) Prior Publication Data

US 2006/0231658 A1    Oct. 19, 2006

(51) Int. Cl.
*G11B 23/04*    (2006.01)

(52) U.S. Cl. .................... 242/338.4; 360/132

(58) Field of Classification Search .............. 242/338.4, 242/348, 348.2, 611, 611.1; 360/93, 96.5, 360/132

See application file for complete search history.

(56) References Cited

U.S. PATENT DOCUMENTS

| | | | |
|---|---|---|---|
| 4,234,140 A | 11/1980 | Van Nie et al. | |
| 4,757,958 A | 7/1988 | Elliott et al. | |
| 5,366,173 A | 11/1994 | Lammers et al. | |
| 5,371,638 A | 12/1994 | Saliba | |
| 5,443,220 A | 8/1995 | Hoge et al. | |
| 5,564,647 A | 10/1996 | Bay et al. | |
| 5,760,995 A | 6/1998 | Heller et al. | |
| 5,777,830 A | 7/1998 | Wrobel et al. | |
| 5,803,388 A | 9/1998 | Saliba et al. | |
| 5,881,960 A | 3/1999 | Christie | |
| 6,062,500 A | 5/2000 | Coles | |
| 6,099,173 A | 8/2000 | Merz et al. | |
| 6,164,579 A | 12/2000 | Todd | |
| 6,252,842 B1 | 6/2001 | Mukawa | |
| 6,273,352 B1 | 8/2001 | Johnson et al. | |
| 6,315,230 B1 | 11/2001 | Hansen et al. | |
| 6,427,934 B1 | 8/2002 | Saliba et al. | |
| 6,482,094 B2 | 11/2002 | Kefes | |
| 6,490,114 B1 | 12/2002 | Gill et al. | |
| 6,650,504 B2 | 11/2003 | Ridl | |
| 6,817,562 B2 * | 11/2004 | Evanoff et al. ............... 242/340 |
| 2002/0166913 A1 | 11/2002 | Ridl et al. | |
| 2002/0195513 A1 | 12/2002 | Nejezchleb et al. | |

(Continued)

FOREIGN PATENT DOCUMENTS

WO    WO-98/15957 A1    4/1998

(Continued)

OTHER PUBLICATIONS

European Search Report mailed Jul. 25, 2006 for EP Application No. 06251566.3, six pages.

*Primary Examiner*—William A Rivera
(74) *Attorney, Agent, or Firm*—Morrison & Foerster LLP

(57) ABSTRACT

Described herein are centering systems, including cartridge reels, reel drivers, and methods of using them. Aspects of the invention may include cartridges, tape drives, and systems of using the cartridge reels and reel drivers. A centering system may comprise a cartridge reel having gear teeth and a guide channel. The guide channel may mate with an alignment ring on a reel driver to center the cartridge reel with respect to the reel driver so that gear teeth on the reel driver may properly engage the gear teeth on the cartridge reel. Thus, the centering system (or components of the centering system) may be used to prevent misalignment and slipping between a cartridge reel and a reel driver.

18 Claims, 8 Drawing Sheets

U.S. PATENT DOCUMENTS

2004/0089755 A1 5/2004 Evanoff et al.
2004/0140390 A1 7/2004 Saliba
2004/0140391 A1 7/2004 Saliba
2004/0140392 A1 7/2004 Saliba
2005/0023397 A1 2/2005 Hiraguchi

FOREIGN PATENT DOCUMENTS

WO    WO-01/09896 A1    2/2001

* cited by examiner

CARTRIDGE REEL CENTERING DEVICE

BACKGROUND OF THE INVENTION

1. Field of the Invention

The invention relates generally to media storage devices, and more specifically to devices, systems and methods of aligning media cartridges with rotatable reels within tape drives.

2. Description of the Related Art

Magnetic tape cartridges have been used to conveniently and efficiently store and handle magnetic recording media for tape drives. One type of tape cartridge consists of a substantially rectangular exterior cartridge housing and a single cartridge reel containing a magnetic tape positioned within the housing. The cartridge housing includes an upper housing section and a lower housing section that substantially enclose the magnetic tape, which includes a cartridge leader. The cartridge leader becomes exposed through an opening in the cartridge housing during insertion of the cartridge into the tape drive. The tape drive is then able to engage and retrieve the tape from the cartridge for recording and/or playback.

The cartridge reel may include a hub, one or more flanges, and a plurality of teeth (cartridge reel gear teeth) that are exposed through an access opening in the lower housing section. A reel driver may include a drive clutch for engaging these cartridge reel gear teeth to rotate the cartridge reel. Typically, a spring within the cartridge housing biases the reel toward the lower housing section. If the gears (e.g., teeth) on the reel driver properly engage the gears (e.g., teeth) on the cartridge reel, the tape drive may exert a force against the reel, urging the reel toward the upper housing section, thereby partially compressing the spring to promote a secure engagement between the reel driver (e.g., drive clutch) and the reel. The tape drive may then rotate the reel and guide the tape across a data transducer that reads data from and/or writes data to the tape. The cartridge reel can move at least somewhat radially (e.g., perpendicular to the rotational axis of the cartridge reel) within the cartridge housing, to allow for drive tolerances (e.g., variations in drive and/or cartridges).

While some radial movement may be desirable, radial movement may become problematic when mating the cartridge reel with a drive. Typically, during normal operation in a tape drive, cartridge reel gear teeth mate with reel driver gear teeth on the drive clutch region of the reel driver. If the cartridge reel and reel driver centerlines are not axially aligned, the gears will have difficulty mating. This may result in slipping or miscoupling, commonly referred to as "whir," due to the sound the gears make when not engaged.

Miscoupling due to radial misalignment prevents the proper functioning of the cartridge. Miscoupling is common enough that most commercially available drives are designed to detect when gears are not properly mated, and to conduct a retry. Furthermore, miscoupling may damage the cartridge or drive gears, and may generate debris that may further interfere with cartridge function.

Centering the cartridge reel with a reel driver within a tape drive may be made even more difficult when a cartridge is placed on its end, so that the tape reel axis is parallel to the ground (e.g., the tape reel is "upright" rather than "flat"), because the cartridge reel may be shifted radially (e.g., perpendicular to the axis of rotation) by gravity. Thus, devices such as cartridge storage libraries, automatic tape cartridge loading devices, and robotic cartridge handlers may exacerbate the problem of miscoupling by shifting the cartridge reel within a tape cartridge housing.

Accordingly, the need exists to provide cartridge reels, a tape drives, and centering systems that reduce or eliminate radial miscoupling. Further, the need exists to provide a cost-effective, efficient method of centering a media cartridge and tape drive that promotes increased accuracy in coupling the tape cartridge and drive.

BRIEF SUMMARY OF THE INVENTION

Described herein are centering systems, including cartridge reels, reel drivers, and methods of using them. Aspects of the invention may include cartridges, tape drives, and systems of using the cartridge reels and reel drivers. A centering system may comprise a cartridge reel having gear teeth and a guide channel. The guide channel may mate with an alignment ring on a reel driver to center the cartridge reel with respect to the reel driver so that gear teeth on the reel driver may properly engage the gear teeth on the cartridge reel. Thus, the centering system (or components of the centering system) may be used to prevent misalignment and slipping between the cartridge reel and the reel driver.

A centering system may axially align a cartridge reel of a data cartridge with a reel driver portion of a drive. The centering system may include a cartridge reel having a ring of cartridge reel gear teeth encircling a cartridge reel central axis (wherein the cartridge reel gear teeth are rotatable about the cartridge reel central axis), and a guide channel encircling the cartridge reel central axis. The centering system may also include a reel driver having a ring of reel driver gear teeth encircling a reel driver central axis (wherein the reel driver gear teeth are rotatable about the reel driver central axis), and an alignment ring encircling the reel driver central axis. The alignment ring may project above the reel driver gear teeth in a direction parallel to the central axis, for mating with the guide channel in the cartridge reel.

In some variations of the centering system, the cartridge reel central axis is alignable to the reel driver central axis when the alignment ring of the reel driver mates with the guide channel of the cartridge reel.

Also described herein are cartridge reels for spooling tape thereon and for centering with a reel driver. The cartridge reels may include: a hub, wherein tape wraps around the hub, having a cartridge reel central axis; a ring of cartridge reel gear teeth encircling the cartridge reel central axis, wherein the cartridge reel gear teeth are rotatable about the cartridge reel center axis; and a guide channel encircling the cartridge reel central axis for mating with an alignment ring projecting from a reel driver.

The guide channel may be located axially to the ring of gear teeth, closer to the cartridge reel central axis of the cartridge reel. For example, the guide channel may be located within a radius of between about 0.1 to about 0.5 inches from the cartridge reel central axis. In one variation, the guide channel is located about 0.375 inches from the cartridge reel central axis. The guide channel may comprise an opening for mating with an alignment ring having a width of between about 0.050 and about 0.200 inches. For example, the guide channel may comprise an opening for mating with an alignment ring having a width of about 0.125 inches at the base. In some variations, the alignment ring may have an upper width (e.g., at the top) of between about 0.0 inches (e.g., it may come to a peak) and 0.050 inches.

In some variations, the guide channel comprises a triangular channel profile. The guide channel may comprise a wall angled about 45 degrees from the cartridge reel central axis.

Also described herein are storage media cartridges. The storage media cartridges include: a housing having a driver access opening; and a drive reel as described, wherein the guide channel is accessible through the driver access opening.

Also described herein are reel drivers for engaging a cartridge reel by aligning with a guide channel on the cartridge reel. The reel driver may include: a ring of reel driver gear teeth encircling a reel driver central axis, wherein the reel driver gear teeth are rotatable about the reel driver central axis; and an alignment ring encircling the reel driver central axis, wherein the alignment ring projects above the reel driver gear teeth in a direction parallel to the central axis, for mating with a guide channel in a cartridge reel.

In some variations, the alignment ring projects about 0.025 above the reel driver gear teeth. The alignment ring may be located axially to the ring of reel driver gear teeth, closer to the reel driver central axis on the reel driver. For example, the alignment ring may be located within a radius of between about 0.1 to about 0.5 inches from the reel driver central axis. In one variation, the alignment ring is located about 0.375 inches from the reel driver central axis. The alignment ring may have a width of between about 0.050 and 0.200 inches. For example, the alignment ring may have a width of about 0.125 inches. The alignment ring may have a triangular profile.

The alignment ring may comprise a continuous ring having a uniform profile about the reel driver central axis.

Also described herein are tape drives comprising: a read/write head for reading and writing data on a tape; and a reel driver as described (for centering a cartridge reel by engaging the alignment ring of the reel driver).

Also described herein are methods for aligning a cartridge reel with a reel driver within a tape drive. The method may comprise: positioning a cartridge reel comprising a cartridge reel central axis and a guide channel encircling the cartridge reel central axis, opposite of a reel driver comprising a reel driver central axis and an alignment ring encircling the reel driver central axis, so that the alignment ring may contact the guide channel; and decreasing the distance between the alignment ring of the reel driver and the guide channel of the cartridge reel, until the cartridge reel central axis is aligned with reel driver central axis.

The present invention is better understood upon consideration of the detailed description below in conjunction with the accompanying drawings and claims.

DETAILED DESCRIPTION OF THE INVENTION

The following description is presented to enable a person of ordinary skill in the art to make and use the various aspects and examples of the invention. Descriptions of specific materials, techniques, and applications are provided only as examples. Various modifications to the examples described herein will be readily apparent to those skilled in the art, and the general principles defined herein may be applied to other examples and applications without departing from the spirit and scope of the invention. Thus, the present invention is not intended to be limiting to the examples described and shown, but is to be accorded the scope consistent with the appended claims.

Whir (e.g., sliding between a media cartridge and a tape driver) generally results when the media cartridge reel and the reel driver are off-center. Thus, effectively centering the cartridge reel with the reel driver may reduce or eliminate whir. Described herein are cartridge reels, reel drivers, centering systems, and methods of using them for aligning a cartridge reel with a reel driver.

In general, a cartridge may include a reel that is rotatably disposed within a housing. The cartridge housing may include at least one driver access opening to provide a reel driver with access to the cartridge reel. A cartridge may also include a biasing member to bias the reel towards the driver access opening. The driver access opening is typically a circular cut out region of the cartridge housing that is generally big enough to provide access to cartridge reel gear teeth on the drive facing side of the cartridge reel. Examples of cartridges and cartridge reels that may be used or adapted to be used with the devices, systems and methods described herein may be found in U.S. Pat. No. 6,062,500, U.S. patent application Ser. No. 10/349,498, entitled "BUTTERFLY TAPE REEL" (filed Jan. 21, 2003), U.S. patent application Ser. No. 10/349,481, entitled "TAPE GUIDING REEL" (Jan. 21, 2003), and U.S. patent application Ser. No. 10/349,152, entitled "EDGE GUIDING TAPE REEL" (filed Jan. 21, 2003), each of which are herein incorporated by reference in their entirety.

Figure 1:
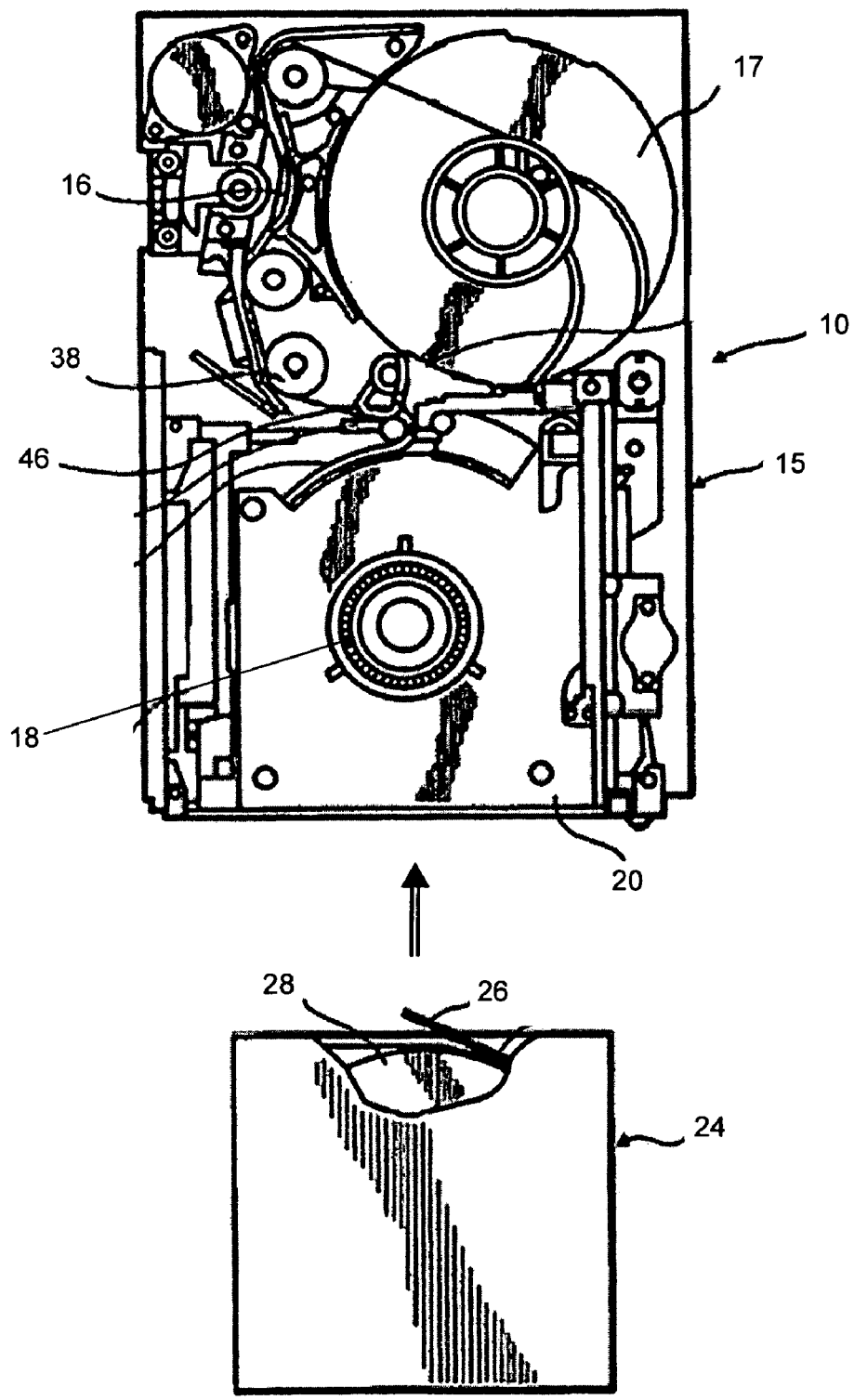
FIG. 1 illustrates a plan view of an exemplary tape drive and tape cartridge.

FIG. 1, illustrates a tape drive 10 that may be used with an exemplary cartridge 24 including an exemplary cartridge reel as described herein for centering with a reel driver. Tape drive 10 includes a tape drive housing 15, a data transducer, i.e., read and/or write head 16, a take-up reel 17, and a receiver 20. Tape drive 10 is used in conjunction with a cartridge 24 which houses storage tape on a cartridge reel 28 (which may also be referred to as a supply reel). Receiver slot 20 is configured to receive a suitable cartridge 24 therein, adjacent to reel driver 18. Tape drive 10 may also include a door and various mechanisms for receiving and ejecting cartridge 24. When cartridge 24 is received in receiver slot 20, the cartridge reel may engage the drive clutch region of the reel driver to control the rotation of the cartridge reel. The step of aligning the cartridge reel and the reel driver (e.g., drive clutch) so that the gears on the cartridge reel may be engaged by the gears on the real driver may be referred to as centering of the cartridge reel and the reel driver. Once the drive clutch gears have engaged the gears on the cartridge reel, a buckler motor 46 or the like may engage cartridge leader 26 and stream storage tape along a tape path within tape drive 10 passing read/write head 16 and onto take-up reel 17. The tape path may include various tape guides, rollers 38, one or more read/write heads 16, and the like before being wound upon a take-up reel 17.

A tape drive 10 may be installed within or associated with a computer (not shown) or computer network. A detailed description of an illustrative tape drive may be found in U.S. Pat. No. 5,371,638 to G. Saliba, which is herein incorporated by reference in its entirety. Additionally, a tape drive 10 may be used as part of an automated tape library having a plurality of tape cartridges and a robotic transfer mechanism to transport cartridges to one or more tape drives. An exemplary storage library is described in U.S. Pat. No. 5,760,995, entitled "MULTI-DRIVE, MULTI-MAGAZINE MASS STORAGE AND RETRIEVAL UNIT FOR TAPE CARTRIDGES," which is hereby incorporated by reference in its entirety.

Cartridge Reel

A cartridge 24 may include a substantially rectangular cartridge housing which encloses a cartridge reel 28 and may have a data storage tape wound thereon. Storage tape may be any appropriate data medium that may used to store and retrieve data, such as magnetic data tape, optical data tape, etc. Data tape of any appropriate size may be used on the cartridge reel. Cartridge 24 may further include a cartridge door to protect storage tape therein and a cartridge leader 26, which is exposed when the door is open. Storage tape may store information in any appropriate form (e.g., digital) that may be subsequently retrieved if desired. Storage tape may be any appropriate size and length. For example, storage tape may be approximately one-half inch in width, but larger and smaller widths are contemplated, e.g., 4-8 mm. Storage tape may have any appropriate thickness (e.g., approximately 0.5 mil, or thinner). Typically, storage tape may include a storage surface on one side of storage tape that may be divided into a plurality of parallel tracks along the length of storage tape. Alternatively, the data may be recorded in diagonal strips across storage tape.

It should be understood that exemplary cartridges reels and cartridges described herein may be used with various tape drives not explicitly shown or described. For example, the cartridge reel may be any appropriate type of media reel, including a cassette reel. Additionally, various other features of a tape drive may be included, for example, various buckler systems, roller guides, tape guides, receiving mechanisms, dampers, and the like may be used.

Figure 2:
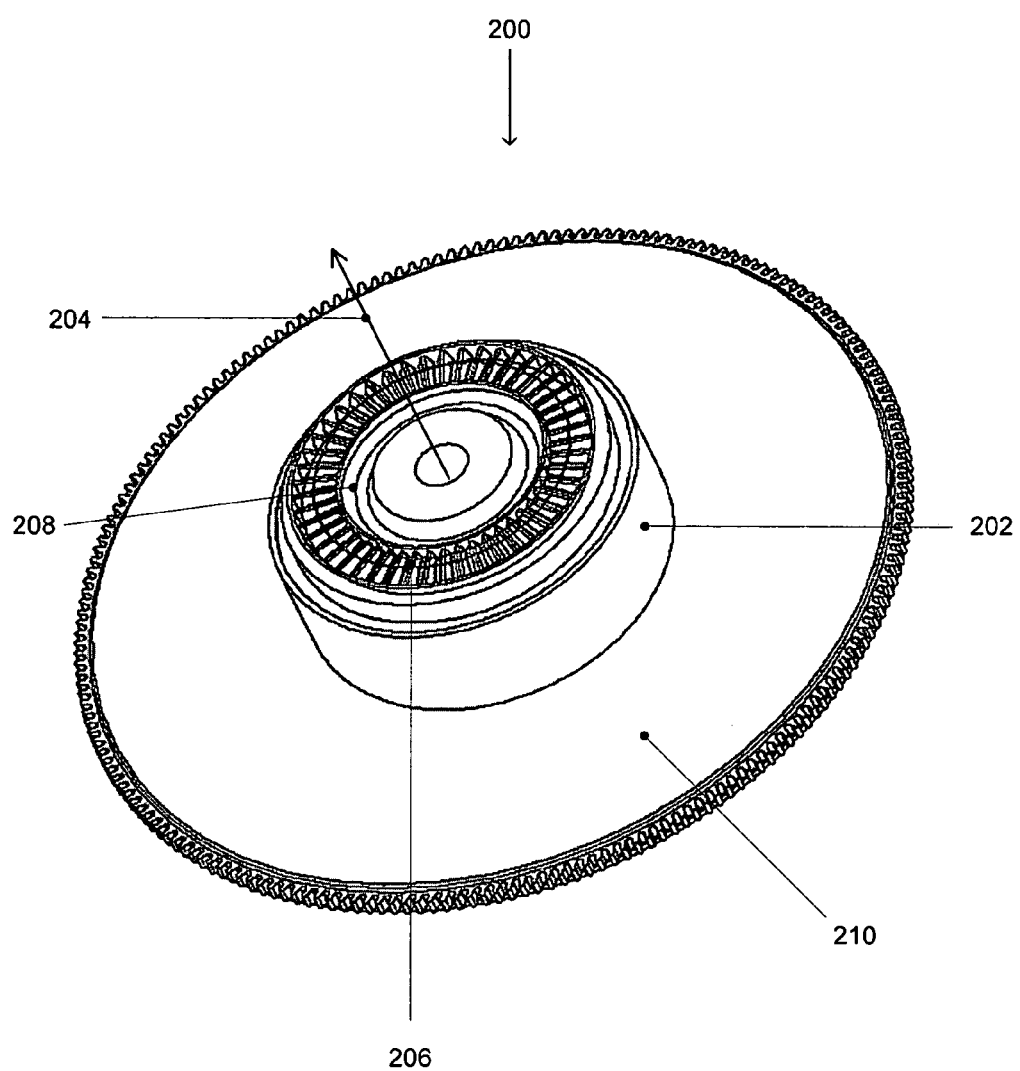
FIG. 2 shows a perspective view of a cartridge reel as described herein.

FIG. 2 shows a perspective view of an exemplary cartridge reel 200 compatible with the centering system described herein. In general, a cartridge reel may include a hub 202 that has at least one surface (e.g., wall) that a storage tape may be wound onto. The hub may have a cartridge reel central axis 204, about which the cartridge reel rotates. In FIG. 2, the cartridge reel 200 also includes a single flange 210, on one side of the hub. The flange may help guide the tape. In some variations, the cartridge reel does not have a flange, and in some variations, the cartridge reel has more than one flange. The cartridge reel 200 also has a ring of cartridge reel gear teeth 206 arranged radially around the cartridge reel central axis 204 that are configured to engage with reel driver gear teeth (e.g., in a tape drive). The cartridge reel gear teeth 206 are typically located on a region of the cartridge reel that is exposed to the driver access opening on one face of the cartridge (e.g., the drive-mating face of the cartridge reel). The cartridge reel gear teeth may be of any appropriate shape and size for mating with reel driver gear teeth on a reel driver. For example, the cartridge reel gear teeth 206 in FIG. 2 are arranged in an annular ring around the cartridge reel central axis.

The cartridge reel may also include a guide channel 208. The guide channel may mate with an alignment ring (e.g., projecting from a reel driver). In general, the guide channel is an open channel, providing access to an alignment ring so that the alignment ring may fit into the channel (or a region of the channel). The guide channel is located on the same face of the cartridge reel as the cartridge reel gear teeth 206.

The upper opening of the guide channel (the region of the guide channel open to allow an alignment ring to be seated in the channel) may be at the same level as the top of the cartridge reel gear teeth. In some variations, the upper opening of the guide channel may project above the cartridge reel gear teeth. In some variations, the guide channel encircles the cartridge reel central axis. For example, in FIG. 2, the guide channel is a continuous (circular) channel symmetrically encircling the cartridge reel central axis. The guide channel may comprise a non-circular channel (e.g., a channel may comprise an ellipse, a polygon, etc.).

In FIG. 2, the guide channel 208 is concentric to the ring of cartridge reel gear teeth 206, and is surrounded by the cartridge reel gear teeth. In some variations, the guide channel is located outside of the cartridge reel gear teeth. Generally, the guide channel may be located anywhere on the driver-mating face of the cartridge reel that may be accessed by a portion of the reel driver. Thus, the guide channel may be exposed in the drive access opening. In one variation, the guide channel passes through the cartridge reel guide teeth.

The guide channel is typically configured to mate with an alignment ring so that the cartridge reel gear teeth may engage with reel driver gear teeth when a guide channel and an alignment ring are properly centered (e.g., when the cartridge reel central axis is aligned with the reel driver central axis). Thus, the dimensions (and location) of the guide channel and the alignment ring may be chosen so that they correspond to each other to permit centering, and to allow the cartridge reel gear teeth and the reel driver to properly engage.

In some variations, the width of the guide channel and the width of the alignment ring are similar (e.g., nearly identical), so that when they are fully mated, the alignment ring may rest within the guide channel, and the cartridge reel central axis corresponds to the reel driver central axis. FIGS. 3A to 3D show cross-sectional profiles through four different variations of guide channels. In FIGS. 3A to 3D, the cartridge reel gear teeth would be disposed on the right side of the cross-section 302, so that the top of the cartridge reel gear teeth is the top the guide channel on at least one side of the guide channel.

Figure 3A:
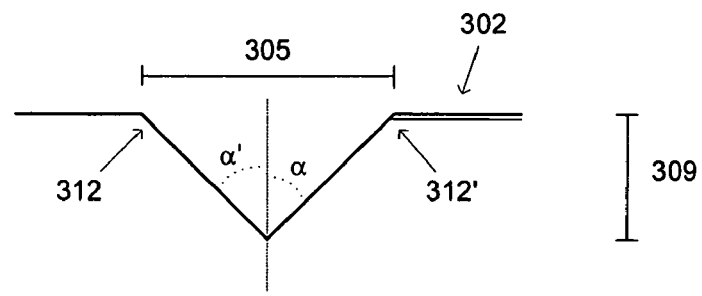
FIG. 3A-3D show cross-sectional profiles of guide channels as described herein.
Figure 3B:
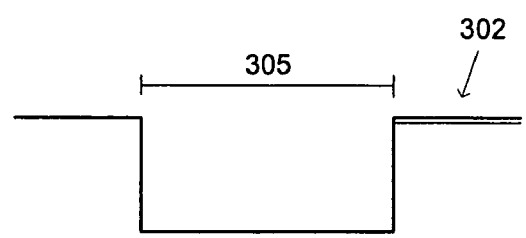
Figure 3C:
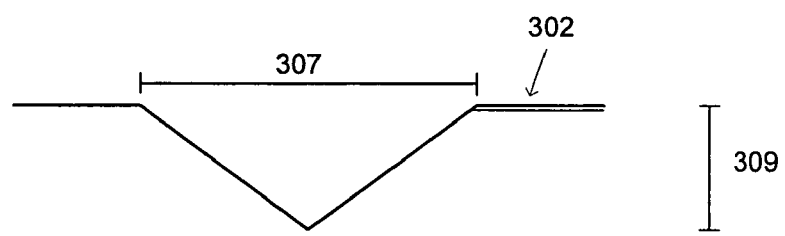

In some variations, the guide channel has a cross-section that comprises a triangular cut, as shown in FIGS. 3A and 3C. In FIG. 3A, the sides of the cross-section of the guide channel are at an angle from the cartridge reel central axis. For example, the angle between the right side of the channel profile and the cartridge reel central axis may be represented by the angle $\alpha$. In some variations, the guide channel has a triangular profile that is symmetric (e.g., both walls of the triangular cut may comprise the same angle, e.g., $\alpha = \alpha_1$, as shown in FIG. 3A). In some variations, the guide channel has a triangular profile with walls that are at different angles (e.g., $\alpha$ is not the same as $\alpha_1$). In some variations, the guide channel has walls that are angled at between about 10 and 70 degrees. In some variations, the guide channel has walls that are angled at about 45 degrees.

Figure 3D:
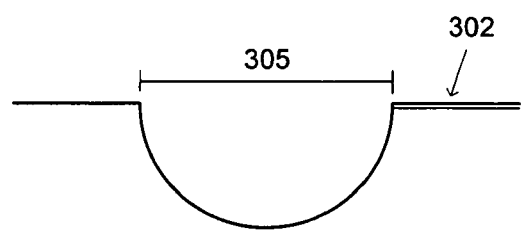

The guide channel may have any appropriate cross-sectional shape. For example, in some variations, the guide channel comprises a rectangular cross-sectional cut (e.g., having walls that are at about a 90 degree angle with the drive-mating face, as shown in FIG. 3B. FIG. 3D shows a guide channel having a cross-sectional shape that is circular. In some variations, the guide channel may have walls and a bottom, as shown in FIG. 3B. For example, the guide channel may have a bottom that is parallel to the drive-mating face.

The guide channel may be any appropriate width. For example, the triangular guide channels shown in FIGS. 3A and 3C have the same depth 309, but the guide channel in FIG. 3A has a narrower width 305 than the guide channel in FIG. 3C 307. In some variations, the guide channel has a uniform cross-sectional profile all the way around the guide channel. In some variations, the cross-sectional profile of the guide channel may vary in different regions of the guide channel.

In some variations, the guide channel has a width 305, 307 that is between about 0.050 and 0.200 inches. In some variations, the width of the opening is about 0.125 inches. Similarly, a guide channel may be any appropriate depth.

The guide channel may comprise any appropriate material. For example, the guide channel may be cut out of the material of the cartridge reel. Thus, the guide channel may have walls that comprise a plastic, or polymeric material. In some variations, the guide channel may comprise a different material than the body of the cartridge reel. The guide channel may comprise a metal, a ceramic, or a polymer. The guide channel may comprise a lubricious material (e.g., Fluoropolymers such as Teflon, PTFE, FEP, or the like). In some variations, the guide channel comprises a coating, such as lubricant. In some variations, the sides (or a portion) of the sides of the guide channel are made from a material that matches the material of the alignment ring. The guide channel may also comprise a reinforcement to prevent damage to all or a portion of the guide channel. For example, the upper rim 312, 312' of the guide channel may comprise a structural or material reinforcement to prevent damage to the guide channel or assist sliding of the guide ring and all or a portion of the alignment ring. In some variations, this upper rim may be sloped or curved (e.g., the edge may be rounded). In some variations, the guide channel and/or the alignment ring may comprise an additional guide element, such as a magnetic material.

Although the guide channel has been described as inscribed in the cartridge reel when the guide ring projects from the reel driver, a guide channel may also be present on the reel driver, and an alignment ring may be present on the cartridge reel. In some variations, the cartridge reel comprises both a guide channel and an alignment ring. For example, the cartridge reel may comprise an alignment ring that is located concentrically to a guide channel, and configured to mate with a guide channel or an alignment ring on a reel driver (or both a guide channel and an alignment ring).

Reel Driver

In general, the reel driver comprises gears (e.g., reel driver gear teeth) that may mate with the gears (e.g., cartridge reel gear teeth) of a cartridge reel in order to control rotational movement of the cartridge reel. Gears such as reel driver gear teeth may encircle a reel driver central axis about which the gears of the reel driver may rotate. For example, reel driver gear teeth may concentrically surround the reel driver central axis, so that the ridges of the gear teeth project away from the reel driver central axis. In some variations, the reel driver comprises a drive clutch region. The reel driver gear teeth may be disposed on the clutch region, which may rotate the reel driver gear teeth around the reel driver central axis.

Figure 4A:
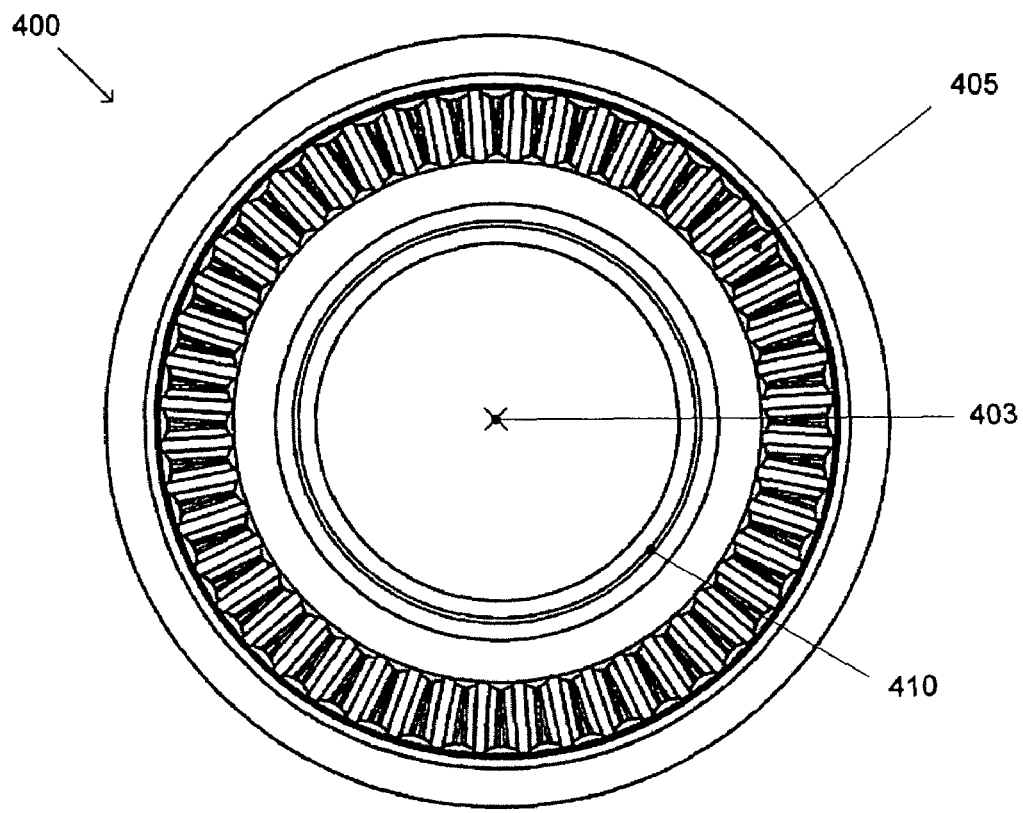
FIGS. 4A and 4B shows top and side views (respectively) of a reel drive as described herein.
Figure 4B:
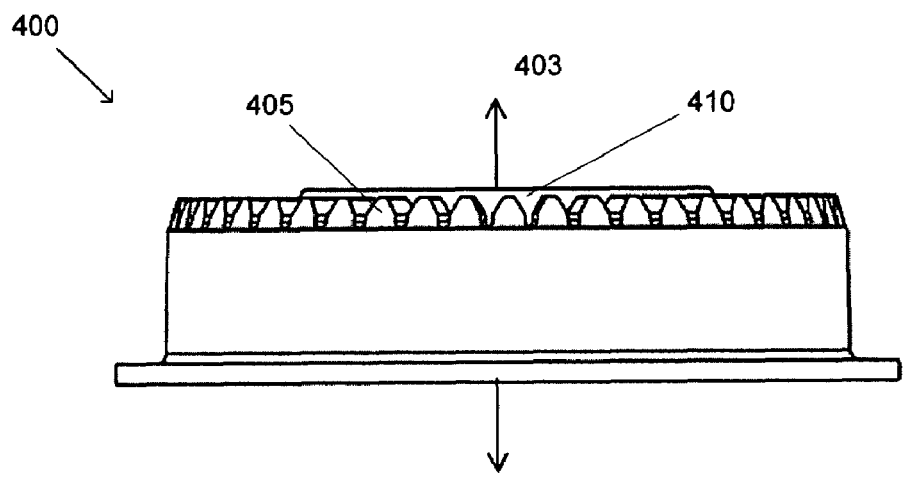

FIGS. 4A and 4B show top and side perspective views, respectively, of a reel driver 400. In FIG. 4A, the reel driver 400 has a reel driver central axis 403, and reel driver gear teeth 405, that are arranged encircling the reel driver central axis. Thus, the reel driver gear teeth may engage the cartridge reel gear teeth. A region of the reel driver may be a drive clutch that may rotate the gear teeth to move the cartridge reel once the cartridge reel gear teeth are engaged with the reel driver gear teeth.

Figure 4C:
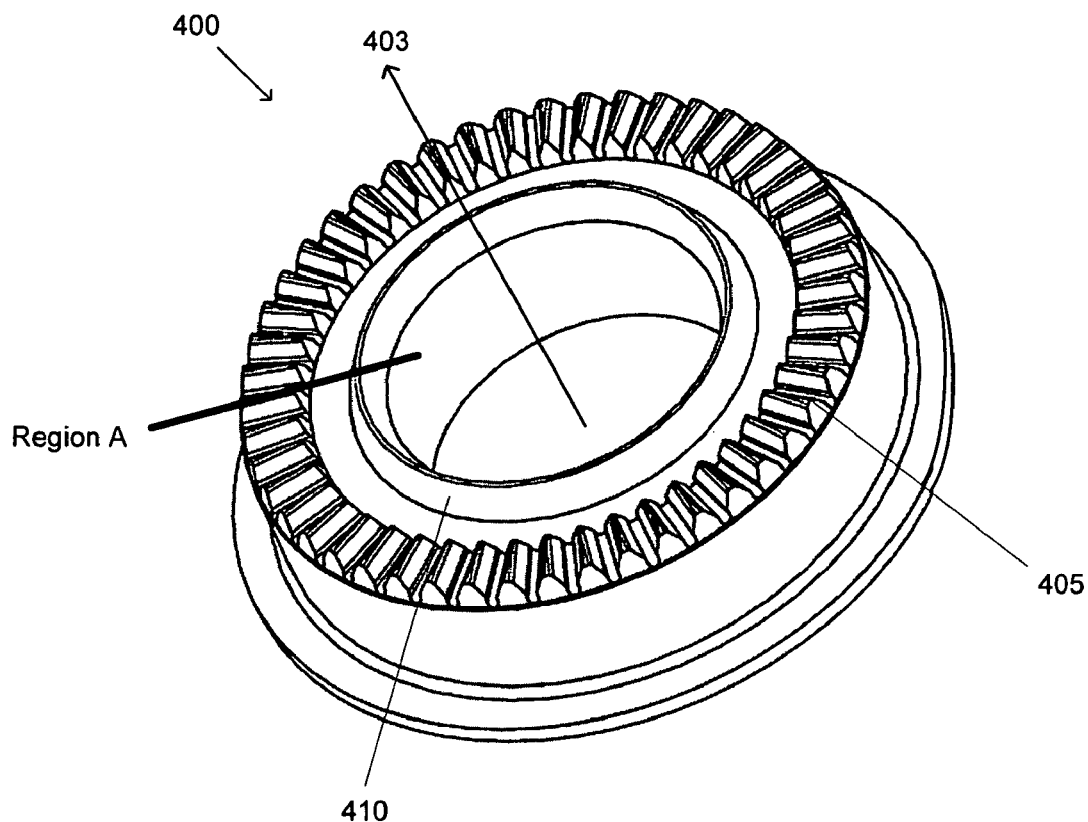
FIG. 4C shows a perspective view of the reel driver of FIGS. 4A and 4B.

The reel driver may also comprise an alignment ring 410 that projects above the top of the reel driver gear teeth on the reel driver to mate with a guide channel on a cartridge reel. The side view of the reel driver shown in FIG. 4B shows an alignment ring 410 projecting just above the reel driver gear teeth 405. In some variations, the alignment ring projects between about 0.010 and 0.100 inches above the reel driver gear teeth. In some variations, the alignment ring projects about 0.025 inches above the reel driver gear teeth. FIG. 4C shows a perspective view of the reel driver shown in FIGS. 4A and 4B. The alignment ring 410 may symmetrically encircle the reel driver central axis 403, as show in FIGS. 4A to 4C.

Figure 4D:
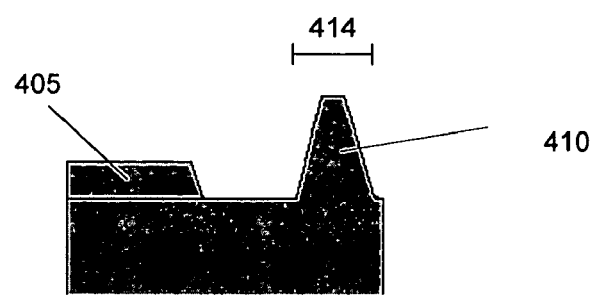
FIG. 4D shows a cross-sectional profile of region A from the reel driver of FIG. 4C.

FIG. 4D shows a cross-sectional profile of a portion of a reel driver 400, taken from the region A shown in FIG. 4C, including the cross-section of the alignment ring 410. The alignment ring has a triangular cross section with a flattened top. FIG. 4D also shows a cross-section of a portion of the reel driver gear teeth 405. The alignment ring projects above the height of the reel driver gear teeth 405. In general, the width of the alignment ring 414 (e.g., the width at the base) may be less than or equal to the width of the guide channel that the alignment ring may mate with. The alignment ring may be any appropriate shape and size to mate with a guide channel. In some variations, a profile though one portion of a guide ring has a profile that is approximately the same size as a profile through a guide channel (e.g. the guide channel profiles shown in FIGS. 3A to 3D). In some variations, the guide channel projects from the reel driver to a height that is smaller than the depth of a guide channel.

In some variations, the alignment ring is not a continuous ring, but may be a ring of discrete projections. For example, the alignment ring may comprise a ring of knobs or projections surrounding the reel driver central axis (or drive clutch). In some variations, the alignment ring comprises a ring having a variable height and/or thickness in different regions of the ring. In some variations, the guide ring may comprise gears, such as teeth, that may engage with gears on the cartridge reel. For example, the alignment ring may have gear teeth that are continuous with reel driver gear teeth 405. For example, the alignment ring may be a region of the reel driver gear teeth.

In some variations, the alignment ring may comprise a circle (as show in FIGS. 4A to 4C), encircling the reel driver central axis. In some variations, the alignment ring comprises an ellipse surrounding the reel driver central axis. Thus, the alignment ring may comprise any appropriate shape. In some variations, the alignment ring is off-centered around the reel driver central axis. Thus, the alignment ring may be located in any appropriate location around the reel driver central axis so that the alignment ring may mate with a guide channel to align the cartridge reel central axis and the reel driver central axis.

The alignment ring may be made of any appropriate material. For example, the alignment ring may comprise the same material as the reel driver. The alignment ring may comprise a metal, a ceramic, a polymer, or some combination thereof. In some variations, the alignment ring comprises the same material as a guide channel to which it may mate. In some variations the alignment ring comprises a coating, such as a lubricious coating. In some variations, the alignment ring is reinforced. For example, the edge (e.g., the top edge) of the alignment ring may be reinforced or specially shaped (e.g., rounded) to prevent wear or damage to the alignment ring, guide channel, or any other portion of the cartridge or reel driver.

The reel driver may comprise sensors for sensing when a cartridge reel is engaged with the reel driver. Sensors may be used to determine when the reel driver central axis is aligned with the cartridge reel central axis. In some variations, sensors may be optical, magnetic or electrical sensors. In some variations, the sensors may connect to a controller for controlling the operation of the drive or of the reel driver portion of the drive.

Thus, a reel driver may comprise an alignment ring. In some variations, a reel driver may comprise a guide channel and not an alignment ring. In some variations, a reel driver comprises both a guide channel and an alignment ring. Although the guide channel and alignment ring may be used to center a cartridge reel in a tape drive, the centering system may be used to center any appropriate rotational system having two components with axes that may be (or may become) misaligned with the components are separated.

Centering System

A centering system may comprise a guide channel and an alignment ring. The alignment ring may be configured to mate with the guide channel, as described above. A centering system may comprise a cartridge reel having a guide channel and a reel driver having an alignment ring. The alignment ring and the guide channel may be used to center the cartridge reel central axis (e.g., the axis of rotation) and the reel driver central axis.

The alignment ring may fully mate with the guide channel (e.g., the guide channel may be the "negative" shape of the alignment ring, so that the alignment ring may fit completely into the guide channel. In some variations, only a portion of the alignment ring fits within the guide channel. Thus, the alignment ring may have a wider base than the guide channel.

Method of Aligning

Figure 5A:
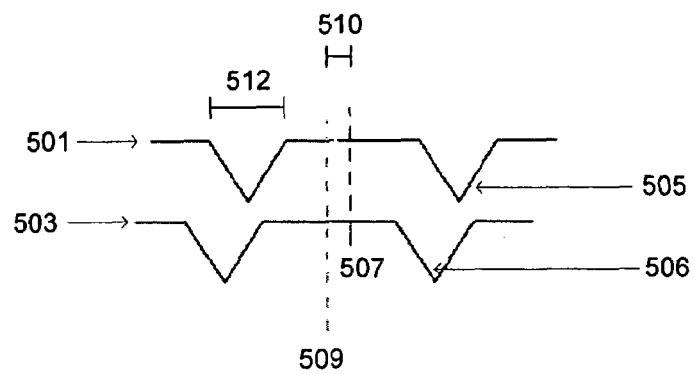
FIG. 5A-5E illustrates an alignment ring aligning with a guide channel as described herein.

In operation, a centering system may be used to align a cartridge reel and a reel driver. FIGS. 5A to 5E illustrate the use of a centering system to align the central axes of a device having an alignment ring 501 (e.g., a reel driver) and a device having a guide channel 503 (e.g., a cartridge reel). The alignment ring 505 and the guide channel 506 are shown in cross-section through the central axes 507,509 of these devices. In FIG. 5A the central axis 509 of the device with the guide channel 503 is shifted to the left of the central axis 507 of the device with the alignment ring 501, and the two devices are initially separated so that they are not touching. In this illustration, the width of the guide channel 506 is approximately equal to the width of the alignment ring 505. The guide channel 505 has a symmetric triangular cut-out shape, and the alignment ring 505 projecting from the upper device 501 also has a triangular profile.

Figure 5B:
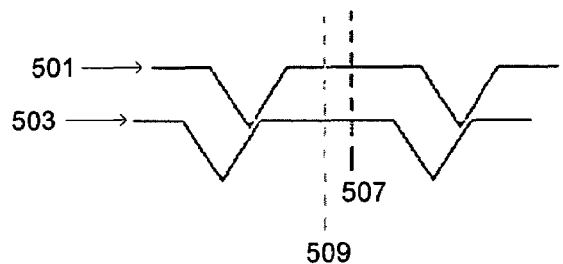
Figure 5C:
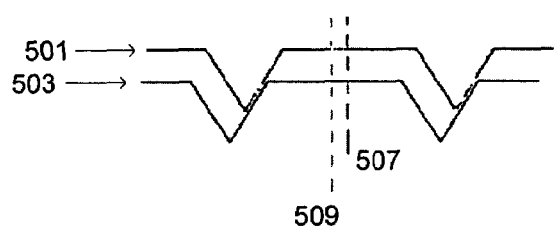

The initial misalignment 510 (e.g., the offset between the central axes of the two devices) in FIG. 5A is less than half the width of the guide channel. In some variations, the device having the alignment ring and the device having the guide channel are first roughly aligned. For example, the rough alignment may bring the central axes of the two devices to within a distance less than or about equal to half the width of a guide channel 512. The axes of the two devices may be aligned by the centering system by moving the two devices closer to each other so that the alignment ring may engage a surface of the guide channel. In FIG. 5B, a portion of the alignment ring 505 (e.g., the tip or a side wall of the alignment ring) contacts a wall of the guide channel 503, as the two devices are brought closer together. The alignment ring 505 slides within the guide channel 506, reducing the misalignment distance 510, as shown in FIG. 5C.

Figure 5D:
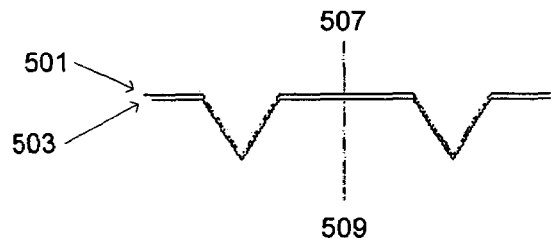

Thus, in some variations, either the device having the alignment ring 501 (e.g., a reel driver), or the device having the guide channel 503 (e.g., the cartridge reel), or both, may encompass some degree of radial movement, permitting movement in a direction perpendicular to the central axis of either device 507, 509. Thus, bringing the two devices closer together may translate sliding forces between the alignment ring 505 and the guide channel 506 into a radial movement so that the central axes of the two devices are aligned, as shown in FIG. 5D. In FIG. 5D, the device having the guide channel (e.g., a cartridge reel) 503 is being centered, and the cartridge axis 509 is allowed to move (e.g., is not fixed).

Figure 5E:
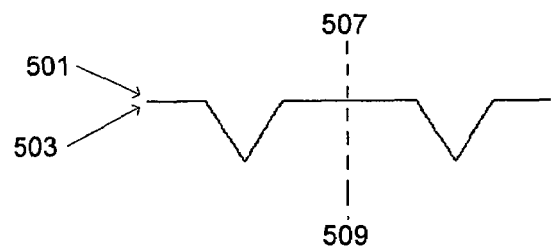

In some variations, the alignment ring almost completely fits into the guide channel when the two devices are brought into full contact, as shown in FIG. 5E. In some variations, the alignment ring does not fully engage the guide channel. For example, the guide channel may be larger than the alignment ring. In particular, the depth of the guide channel may be greater than the height of the alignment ring. Furthermore, the shape of the alignment ring and the guide channel may not be complementary (e.g., the guide channel may have a rectangular cross-section as shown in FIG. 3B, and the alignment ring may have a triangular cross-section, as shown in FIG. 4D. In some variations, the alignment ring has a larger cross-sectional width than the cross-sectional width of the guide channel, so that it cannot fully fit within the guide channel.

In some variations, other regions of the devices may interact (e.g., mate) before the guide channel and the alignment ring fully interlock. For example, gear teeth on the device with the guide channel may mate with gear teeth on the device with the alignment ring before the guide channel and the alignment ring have fully mated.

Figure 6A:
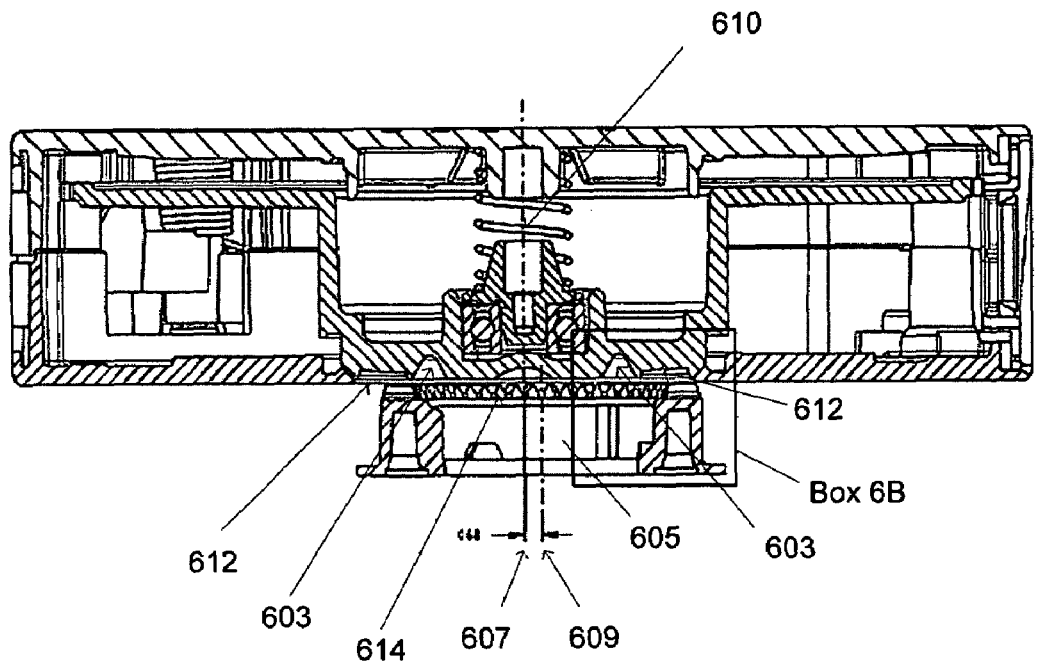
FIG. 6A shows a cross-sectional view of a cartridge with a guide channel coupling to a reel driver that does not have an alignment ring.
Figure 6B:
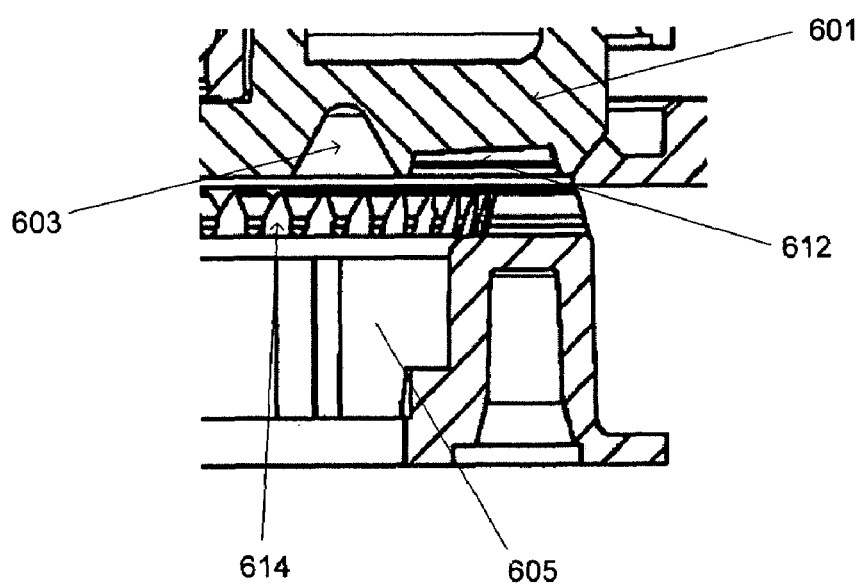
FIG. 6B shows a magnified view of region B of FIG. 6A.

Using the centering system (e.g., the guide channel and alignment ring) as described herein may reduce whir, or other misalignment problems. Furthermore, cartridge reels having a guide channel may be used with reel drivers that do not include an alignment ring. Thus, cartridges may be "backwards compatible" with such reel drivers. FIGS. 6A and 6B show a cartridge reel 601 that has a guide channel 603. This cartridge reel is being used with a reel driver 605 that does not have an alignment ring. The central (e.g., rotational) axis of the cartridge reel 607 (cartridge reel central axis) is misaligned with the central axis of the reel driver 609 (reel driver central axis). FIG. 6B shows a close-up view of the cartridge reel gear teeth 612 and the reel driver gear teeth 614. Although the cartridge reel 601 is pushed against the reel driver 605 by a biasing element 610 (shown as a spring), because the central axes of the cartridge reel and the reel driver are misaligned, the gears may not completely engage. For example, the cartridge reel gear teeth on the left-hand side of the cartridge reel may not engage with reel driver gear teeth in FIG. 6A.

Figure 7A:
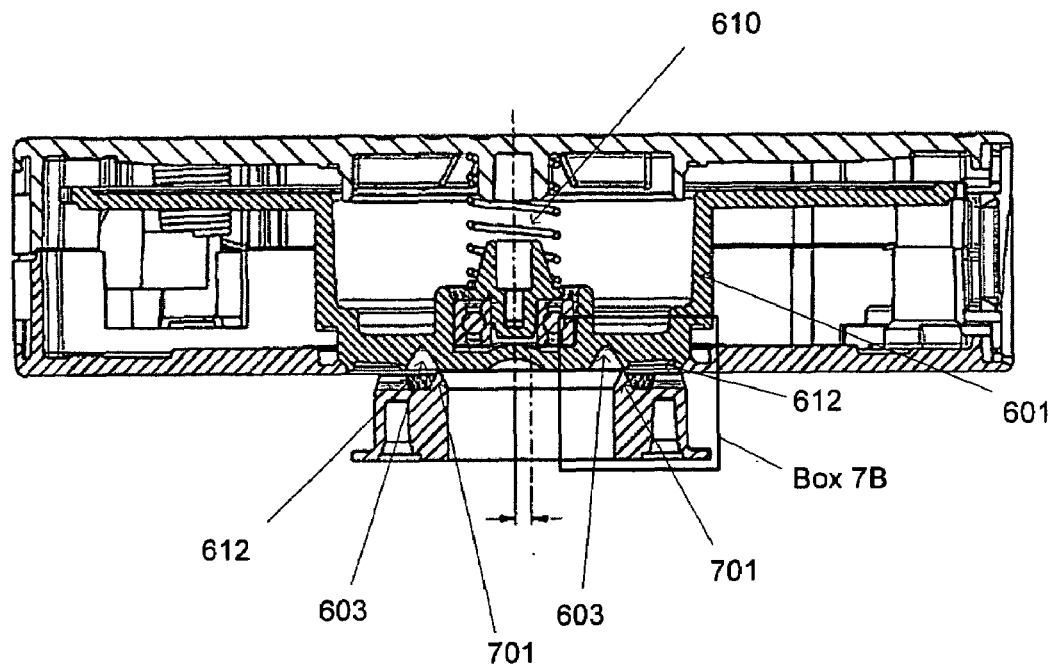
FIG. 7A shows a cross-sectional view of a cartridge with a guide channel coupling to a reel driver that has an alignment ring.
Figure 7B:
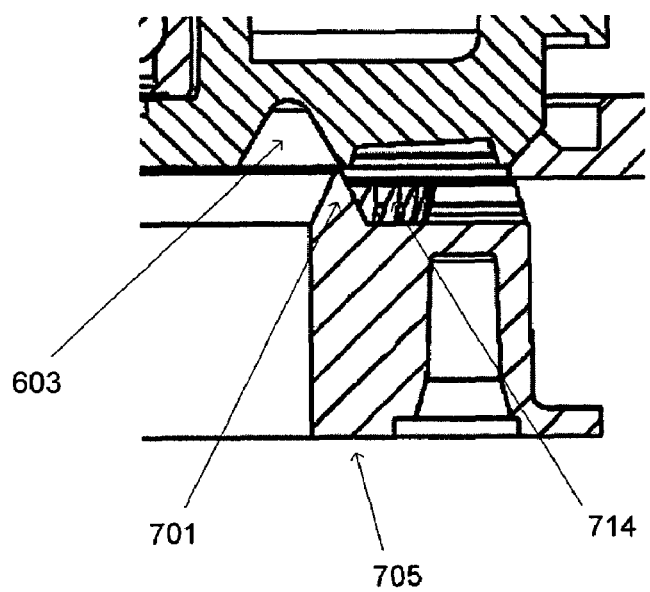
FIG. 7B shows a magnified view of region C of FIG. 7A.

FIGS. 7A and 7B show the same cartridge reel with a guide channel 603 that was shown in FIGS. 6A and 6B. In FIG. 7A, the cartridge has been inserted into a drive having a reel driver 705 that has an alignment ring 701. Thus, the alignment ring 705 and the guide channel may center the cartridge with respect to the reel driver, as previously described. In FIGS. 7A and 7B the guide channel and the alignment rings have not yet aligned the cartridge and the reel driver. In practice, the alignment ring 701 may slide against the guide channel 603 to shift either the reel driver 705 or the cartridge reel 601 radially so that the cartridge reel gear teeth 612 may mate with the reel driver gear teeth 714.

In some variations, a biasing element, such as the spring biasing element shown in FIGS. 6A and 7A may provide a biasing force to move alignment ring against the guide channel. Thus, a biasing element may help align the centering system. In some variations, the centering system may comprise a biasing element configured to move the alignment ring closer to the guide channel. In some variations, the biasing element may force the guide channel into contact with the alignment ring.

Reel drivers having alignment rings may also be "backwards compatible" with cartridge reels, so that the reel drivers may be used with cartridge reels that do not have guide channels. For example, a reel driver may comprise an alignment ring that is positioned so that it does not interfere (e.g., does not engage) with any surface or structure on an cartridge reel. In some variations, the alignment ring may be retractable.

It should be understood that exemplary cartridges, cartridge reels, reel drivers, and centering systems described herein may be used with various drives (e.g., magnetic tape drives) not explicitly shown or described. Additionally, various other features of a tape drive may be included, for example, various buckler systems, roller guides, tape guides, receiving mechanisms, dampers, and the like may be used.

The above detailed description is provided to illustrate various examples and is not intended to be limiting. It will be apparent to those skilled in the art that numerous modification and variations within the scope of the present invention are possible. For example, various examples describes herein may be combined and altered. Further, numerous other materials and processes not explicitly described herein may be used within the scope of the exemplary reels, cartridges, and centering systems described, as will be recognized by those of ordinary skill in the art. Additionally, within the description, particular examples have been discussed and how these examples are thought to address certain disadvantages in related art. This discussion is not meant, however, to restrict the various examples to methods and/or systems that actually address or solve the disadvantages. Accordingly, the present invention is defined by the appended claims and should not be limited by the description herein.

The invention claimed is:

1. A method for aligning a cartridge reel with a reel driver, wherein the cartridge reel comprises a cartridge reel central axis and a guide channel encircling the cartridge reel central axis, wherein the guide channel is coaxial with a ring of gear teeth, has a smaller radius than the ring of gear teeth, and is radially spaced from the ring of gear teeth, and wherein the reel driver comprises a reel driver central axis and an alignment ring encircling the reel driver central axis, the method comprising:

positioning the cartridge reel with respect to the reel driver so that the guide channel contacts the alignment ring; and decreasing the distance between the alignment ring of the reel driver and the guide channel of the cartridge reel, until the cartridge reel central axis is aligned with reel driver central axis.

2. A cartridge reel for spooling tape thereon and for centering with a reel driver, the reel comprising:

a hub, wherein tape wraps around the hub, having a cartridge reel central axis;

a ring of cartridge reel gear teeth encircling the cartridge reel central axis, wherein the cartridge reel gear teeth are rotatable about the cartridge reel center axis; and a guide channel encircling the cartridge reel central axis for mating with an alignment ring projecting from a reel driver, wherein the guide channel is coaxial with the ring of gear teeth, has a smaller radius than the ring of gear teeth, and is radially spaced from the ring of gear teeth.

3. The cartridge reel of claim 2, wherein the guide channel is located at a radius of about 0.375 inches from the cartridge reel central axis.

4. The cartridge reel of claim 2, wherein the guide channel comprises an opening for mating with the alignment ring having a width of between about 0.050 and about 0.200 inches.

5. The cartridge reel of claim 2, wherein the guide channel comprises an opening for mating with the alignment ring, the opening having a width of about 0.125 inches.

6. The cartridge reel of claim 2, wherein the guide channel comprises a triangular channel cross-sectional profile.

7. The cartridge reel of claim 2, wherein the guide cross-section channel comprises a wall angled about 45 degrees from the cartridge reel central axis.

8. A storage media cartridge, comprising: a housing having a driver access opening; and a cartridge reel as described in claim 2, wherein the guide channel is accessible through the driver access opening.

9. A reel driver for engaging a cartridge reel by aligning with a guide channel on the cartridge reel, the reel driver comprising:

a ring of reel driver gear teeth encircling a reel driver central axis, wherein the reel driver gear teeth are rotatable about the reel driver central axis; and an alignment ring encircling the reel driver central axis, wherein the alignment ring projects above the reel driver gear teeth in a direction parallel to the central axis, for mating with the guide channel in the cartridge reel, wherein the alignment ring is coaxial with the ring of reel driver gear teeth, is closer to the reel driver central axis than the ring of reel driver gear teeth, and is radially spaced from the ring of reel driver gear teeth.

10. The reel driver of claim 9, wherein the alignment ring projects about 0.025 inches above the reel driver gear teeth.

11. The reel driver of claim 9, wherein the alignment ring is located at a radius of about 0.375 from the reel driver central axis.

12. The reel driver of claim 9, wherein the alignment ring comprises a cross-sectional width of between about 0.050 and 0.200 inches.

13. The reel driver of claim 9, wherein the alignment ring comprises a cross-sectional width of about 0.125 inches.

14. The reel driver of claim 9, wherein the alignment ring comprises a triangular cross-sectional profile.

15. The reel driver of claim 9, wherein the alignment ring comprises a continuous ring having a uniform cross-sectional profile about the reel driver central axis.

16. A tape drive comprising: a read/write head for reading and writing data on a tape; and a reel driver as described in claim 9 for centering a cartridge reel by engaging the alignment ring of the reel driver.

17. A centering system for axially aligning a cartridge reel of a data cartridge with a reel driver portion of a drive, the centering system comprising:

a cartridge reel comprising:

a ring of cartridge reel gear teeth encircling a cartridge reel central axis; wherein the cartridge reel gear teeth are rotatable about the cartridge reel central axis;

a guide channel encircling the cartridge reel central axis, wherein the guide channel is coaxial with the cartridge reel gear teeth, has a smaller radius than the cartridge reel gear teeth, and is radially spaced from the cartridge reel gear teeth;

a reel driver comprising:
- a ring of reel driver gear teeth encircling a reel driver central axis, wherein the reel driver gear teeth are rotatable about the reel driver central axis; and
- an alignment ring encircling the reel driver central axis, wherein the alignment ring projects above the reel driver gear teeth in a direction parallel to the central axis, for mating with the guide channel in the cartridge reel.

18. The centering system of claim 17, wherein the cartridge reel central axis is aligned to the reel driver central axis when the alignment ring of the reel driver mates with the guide channel of the cartridge reel.

* * * * *